(12) United States Patent
Li et al.

(10) Patent No.: US 12,565,557 B2
(45) Date of Patent: Mar. 3, 2026

(54) REACTION SYSTEM FOR PREPARING POLYMER POLYOL AND METHOD FOR PREPARING POLYMER POLYOL

(71) Applicant: WANHUA CHEMICAL GROUP CO., LTD., Yantai (CN)

(72) Inventors: Fuguo Li, Yantai (CN); Yang Liu, Yantai (CN); Ming Jiang, Yantai (CN); Chengqun Qin, Yantai (CN); Shiqiang Fang, Yantai (CN)

(73) Assignee: WANHUA CHEMICAL GROUP CO., LTD., Yantai (CN)

( * ) Notice: Subject to any disclaimer, the term of this patent is extended or adjusted under 35 U.S.C. 154(b) by 705 days.

(21) Appl. No.: 17/995,384

(22) PCT Filed: Apr. 3, 2020

(86) PCT No.: PCT/CN2020/083353
§ 371 (c)(1),
(2) Date: Oct. 3, 2022

(87) PCT Pub. No.: WO2021/196226
PCT Pub. Date: Oct. 7, 2021

(65) Prior Publication Data
US 2023/0151134 A1 May 18, 2023

(51) Int. Cl.
B01J 19/24 (2006.01)
B01J 4/00 (2006.01)
(Continued)

(52) U.S. Cl.
CPC ......... C08F 283/06 (2013.01); B01J 19/2465 (2013.01); C08G 18/65 (2013.01); B01J 2219/00105 (2013.01)

(58) Field of Classification Search
CPC .............. B01J 4/008; B01J 2219/00103; B01J 2219/01005; B01J 2219/00164; B01J 2219/000768; B01J 2219/00087
See application file for complete search history.

(56) References Cited

U.S. PATENT DOCUMENTS 3,402,023 A * 9/1968 Dobo .................. C08G 63/785
96/159
4,081,249 A * 3/1978 Baillie .................. B01J 8/0055
95/271
(Continued)

FOREIGN PATENT DOCUMENTS

CN 1438249 8/2003
CN 1438249 A 8/2003
(Continued)

OTHER PUBLICATIONS

Machine translation of CN203737184 obtained from the European Patent Office in Jun. 2024 (Year: 2024).*
(Continued)

*Primary Examiner* — Melissa A Rioja
(74) *Attorney, Agent, or Firm* — Barnes & Thornburg LLP

(57) ABSTRACT

A reaction system for preparing polymer polyol and a method for preparing polymer polyol. The reaction system comprises a reactor, a first circulation unit, a second circulation unit, and a flow direction switching unit, wherein the reaction cavity of the reactor is divided into a first reaction chamber and a second reaction chamber by a partition plate, and the top of the partition plate is provided with an overflow port to communicate the first reaction chamber and the second reaction chamber with each other; the first circulation unit enables the material in the first reaction chamber to circulate between the discharge port of the first reaction chamber and the feed port of the first reaction
(Continued)

chamber; the second circulation unit enables the material in the second reaction chamber to circulate between the discharge port of the second reaction chamber and the feed port of the second reaction chamber. The polymer polyol prepared by the reaction system has a low-viscosity effect, and by using the polymer polyol prepared by the method, a polyurethane foam having excellent mechanical properties and high hardness can be obtained.

19 Claims, 4 Drawing Sheets

(51) Int. Cl.

| | | |
|---|---|---|
| *C08F 212/10* | (2006.01) | |
| *C08F 283/06* | (2006.01) | |
| *C08F 290/06* | (2006.01) | |
| *C08G 18/22* | (2006.01) | |
| *C08G 18/40* | (2006.01) | |
| *C08G 18/48* | (2006.01) | |
| *C08G 18/63* | (2006.01) | |
| *C08G 18/65* | (2006.01) | |
| *C08G 18/66* | (2006.01) | |
| *C08G 18/76* | (2006.01) | |
| *C08G 18/80* | (2006.01) | |

(56) References Cited

U.S. PATENT DOCUMENTS

| | | | |
|---|---|---|---|
| 10,125,226 B2 | 11/2018 | Flores Sandoval et al. | |
| 2003/0004217 A1* | 1/2003 | Kawamoto | C08G 18/632 521/50 |
| 2017/0203273 A1* | 7/2017 | Ishizuka | B01J 8/10 |

FOREIGN PATENT DOCUMENTS

| | | |
|---|---|---|
| CN | 1796427 | 7/2006 |
| CN | 101429321 | 5/2009 |
| CN | 102702439 | 10/2012 |
| CN | 102702439 A | 10/2012 |
| CN | 103342785 | 10/2013 |
| CN | 103342785 A | 10/2013 |
| CN | 103923270 | 7/2014 |
| CN | 203737184 U | 7/2014 |
| CN | 104667841 | 6/2015 |
| CN | 104667841 A | 6/2015 |
| CN | 104995227 | 10/2015 |
| CN | 204939365 | 1/2016 |
| CN | 204939365 U | 1/2016 |
| CN | 106362671 | 2/2017 |
| CN | 106362671 A | 2/2017 |
| CN | 106589251 | 4/2017 |
| CN | 106589251 A | 4/2017 |
| CN | 109351317 | 2/2019 |
| CN | 109400867 | 3/2019 |
| CN | 109400867 A | 3/2019 |
| EP | 0350868 | 1/1990 |
| EP | 0350868 A2 | 1/1990 |
| WO | WO 2018/052771 | 3/2018 |
| WO | 2019046558 A1 | 3/2019 |

OTHER PUBLICATIONS

European Search Report, European Application No. EP20928108, mailed Oct. 13, 2023.
L. Shijun, et al., "Study on Polymer Polyols with High Solid Content and Low Viscosity by Continuous Process", Chemical Reaction Engineering and Technology, vol. 21, No. 6, Dec. 2005.
L. Yong, et al., "High Solid Content and Low Viscosity Polymer Polyols by Two-Reactor Continuous Process", Chemical Industry and Engineering, vol. 25, No. 5, Sep. 2008.
International Search Report for PCT/CN2020/083353. Mailed Dec. 30, 2020. 5 pages.
Shijun et al., Study on Plymer Polyols with High Solid Content and Low Viscosity by Continuous Process. School of Chemical Engineering. Tianjin University. 2005. vol. 21, No. 6. 5 pages.
Yong et al., High Solid Content and Low Viscosity Polymer Polyols by Two-Reactor Continuous Process. School of Chemical Engineering and Technology, Tianjin University. 2007. 5 pages.

* cited by examiner

REACTION SYSTEM FOR PREPARING POLYMER POLYOL AND METHOD FOR PREPARING POLYMER POLYOL

TECHNICAL FIELD

The present disclosure belongs to the field of polyurethane materials and processing thereof and, in particular, to a method for preparing polymer polyol and a reaction system for preparing polymer polyol.

BACKGROUND

Polymer polyol (POP) is a kind of modified polyether polyol with special properties, which is prepared by graft copolymerization of vinyl monomers such as acrylonitrile (An) and styrene (St) onto polyether polyol (PPG) which is the matrix. Polymer polyol not only maintains the original flexibility of the polyether chain, but also has the good structure performance of the vinyl polymer, which enables the polyurethane foam to have high load-bearing capability and excellent resilience performance and increases the open porosity of the foam. Therefore, it is widely used for the production of high load-bearing, high resilience soft and semi-rigid polyurethane foams and is applied to automobiles, trains, aircraft manufacturing, furniture industry and other fields.

The polymer polyol may be prepared by continuous processes in a stirred tank that supports continuous feeding and discharging or a combination of such stirred tanks that are connected in series/parallel, or in a tubular reactor or loop reactor that supports continuous feeding and discharging, or may be prepared by batch production or semi-continuous processes in a reaction kettle.

In the semi-continuous processes, only a portion of the raw material is initially put into the reactor, and then the remaining raw material is added into the reactor in one or more metered streams during the reaction.

At present, most polymer polyols in the market are prepared by continuous processes (WO00/5971, U.S. Pat. No. 6,013,731, EP0640633, U.S. Pat. No. 5,268,418, and EP365986), and such polymer polyols have the advantages of wide particle-size distribution and low viscosity. However, the continuous processes have disadvantages of large investment in process equipment, low operating flexibility and poor versatility.

In order to enable the polymer polyol to have both the properties of batch processes such as less investment in equipment, higher operating flexibility and better elasticity and the advantages of continuous processes such as lower viscosity, researchers have carried out some researches. For example, CN1656136A discloses two solutions. One is to prepare two kinds of polymer polyols by a batch process and mix the two polymer polyols according to a certain proportion. The other one is to synthesize a polymer polyol by a continuous process and then with the synthesized polymer polyol as the seed, prepare a polymer polyol by a batch process. However, the two solutions are difficult to implement in terms of industrial equipment. The former requires two different reactors or processes, increasing the difficulty of tank storage, metering and formulation. The latter requires the cooperation of a batch reactor and a continuous reactor, increasing the investment.

SUMMARY

In order to solve the above contradictions of polymer polyol, the present disclosure provides a reaction system capable of obtaining a low-viscosity polymer polyol and also provides a preparation process of the polymer polyol. The polymer polyol prepared based on the solution of the present disclosure has a low-viscosity effect, and a polyurethane foam having excellent mechanical properties and high hardness may be obtained by utilizing the polymer polyol prepared by the method of the present disclosure.

To achieve the object, the present disclosure provides the technical solutions described below.

An aspect of the present disclosure provides a reaction system for preparing polymer polyol, which includes a reactor, a first circulation unit, a second circulation unit and a flow direction switching unit, wherein, a partition plate is provided within a reaction cavity of the reactor, and the reaction cavity is divided into a first reaction chamber and a second reaction chamber by the partition plate, the volume of the first reaction chamber is greater than the volume of the second reaction chamber, and the top of the partition plate is provided with an overflow port to communicate the first reaction chamber and the second reaction chamber with each other;

the first circulation unit is arranged between a discharge port and a feed port of the first reaction chamber and enables the material in the first reaction chamber to circulate between the discharge port of the first reaction chamber and the feed port of the first reaction chamber; preferably, the first circulation unit is provided with a cooler for cooling materials;

the second circulation unit is arranged between a discharge port and a feed port of the second reaction chamber and enables the material in the second reaction chamber to circulate between the discharge port of the second reaction chamber and the feed port of the second reaction chamber; preferably, the second circulation unit is provided with a heater for heating materials;

the flow direction switching unit is configured to switch the material in the first circulation unit either to flow to the feed port of the first reaction chamber or to flow to the feed port of the second reaction chamber, or switch the material in the second circulation unit either to flow to the feed port of the second reaction chamber or to flow to the feed port of the first reaction chamber.

In the reaction system of the present disclosure, the reactor is specifically a vertical tank structure, and the material of the partition plate is not limited and is preferably the same as the material of the reactor.

In some embodiments, in the reaction system of the present disclosure, a space is left between the top of the partition plate arranged in the reactor and the top of the reactor to form the overflow port, and the bottom and both sides of the partition plate are completely welded with the inner wall of the reactor and thus closed. The structure of the upper edge of the partition plate is not limited, and for example, the upper edge of the partition plate may be a horizontal or wavy or sawtooth structure.

In some embodiments, the first circulation unit includes a first circulation line connected between the discharge port and the feed port of the first reaction chamber, where the first circulation line is sequentially provided with a first circulating pump, the cooler and a first valve in an upstream-to-downstream direction thereof; preferably, the first circulation line is also provided with a material mixer. The cooler is arranged in the first circulation unit, and the coolant may be one or a mixture of more of water, brine and ethylene glycol, preferably deionized water. The specific form of the material mixer is not particularly limited, and for example, the specific form of the material mixer may be a form known in the art, preferably a static mixer.

The second circulation unit includes a second circulation line connected between the discharge port and the feed port of the second reaction chamber, where the second circulation line is sequentially provided with a second circulating pump, the heater and a second valve in an upstream-downstream direction thereof. The heater is arranged in the second circulation unit, and the heat source may be heat transfer oil, fused salt, high-pressure steam and the like.

The temperature control in the reaction system may be performed in a manner known in the art. In some preferred embodiments, for the reaction system of the present disclosure, with a cooler arranged in the first circulation unit and a heater arranged in the second circulation unit, the reactor temperature is jointly controlled by the cooler and the heater so that the temperature control effect is good, the temperature fluctuation is small, and the polymerization reaction is stable. In this manner, the side reaction fouling is small, and the reactor cleaning frequency is low.

The flow direction switching unit includes a switching line connected between the first circulation line and the second circulation line, where the switching line is provided with a third valve. The first circulation line and the second circulation line are connected to each other through a switching line, and the flow direction switching action of the flow direction switching unit is started or stopped (or closed) by opening or closing the third valve.

In the reaction system of the present disclosure, the forms of the first circulating pump and the second circulating pump is not particularly limited, and the first circulating pump and the second circulating pump may be, for example, a gear pump, a centrifugal pump, a diaphragm pump and the like. The first circulating pump is specifically configured to output the material in the first reaction chamber from its discharge port to the first circulation line, and the second circulating pump is specifically configured to output the material in the second reaction chamber from its discharge port to the second circulation line.

In some embodiments, the flow direction switching line is connected to the first circulation line at a position upstream of the first valve, and the switching line is connected to the second circulation line at a position upstream of the second valve.

In some embodiments, the reaction system further includes a first feed line and a second feed line, where the first feed line is configured to deliver a material to the first reaction chamber or the second reaction chamber, and the second feed line is configured to deliver a material to the second reaction chamber.

In some embodiments, the first feed line is connected to the first circulation line, and in the upstream-to-downstream direction of the first circulation line, the position where the first feed line and the first circulation line are connected is upstream of the position where the switching line and the first circulation line are connected.

In some embodiments, the second feed line is connected to the second circulation line.

In some embodiments, the ratio of the height of the partition plate to the height of the reactor is 0.6-0.96:1, for example, 0.6:1, 0.7:1, 0.8:1, 0.9:1, 0.96:1 and the like, preferably 0.7-0.9:1. Both the utilization efficiency of the reactor and safety production can be achieved by adopting an optimal height ratio.

In some embodiments, the inner diameter D of the reactor perpendicular to the middle part of the partition plate is divided by the partition plate into an inner diameter section L1 located in the second reaction chamber and an inner diameter section L2 located in the first reaction chamber, and the ratio of L1 to L2 is 1:3.8-5.4, for example, 1:3.8, 1:4.0, 1:4.5, 1:5.4 and the like. Products with different particle sizes are synthesized by adopting a preferred ratio, and these products are mixed, so as to reduce the viscosity of the products. The inner diameter D of the reactor perpendicular to the middle part of the partition plate refers to the inner diameter of the reactor perpendicular to the middle of the height of the partition plate.

In some embodiments, the reactor may specifically consist of a head and a barrel. The upper portion of the barrel is of the same diameter as the lower portion, for example, the barrel is a straight cylinder, or the upper portion of the barrel may not be of the same diameter as the lower portion, for example, the reactor is a conical reactor or a diameter-varied reactor.

In some embodiments, the ratio of the volume of the first reaction chamber to the volume of the second reaction chamber is 4.0-19.0, for example, 4.0, 5.0, 5.6, 6, 7, 8, 8.9, 10, 15, 19 and the like, preferably 5.6-8.9.

The present disclosure provides a method for preparing polymer polyol, where a reaction system for preparing polymer polyol includes a reactor, a reaction cavity of the reactor is divided by a partition plate into a first reaction chamber and a second reaction chamber, the volume of the first reaction chamber is greater than the volume of the second reaction chamber, and the top of the partition plate is provided with an overflow port to communicate the first reaction chamber and the second reaction chamber with each other; the reaction material for preparing polymer polyol includes a reaction base material and a reaction top material; the method includes the following steps:

1) in a first reaction stage:

the reaction base material is added to the second reaction chamber and heated; when the temperature of the reaction base material reaches a first temperature, part of the reaction top material is continuously added to the second reaction chamber, and the reaction temperature is maintained at the first temperature;

2) in a second reaction stage:

when the reaction temperature of the reaction system in the first reaction stage rises, preferably, the reaction temperature rises by 0.5° C. or more (for example, by 0.6° C., 1° C., 2° C., 5° C. and the like, preferably by 0.5° C.-1° C., and more preferably by 0.6° C.-0.7° C.), the reaction top material is stopped to be added to the second reaction chamber, the remaining reaction top material is continuously added to the first reaction chamber, the reaction top material reacts with the material that overflows from the second reaction chamber to the first reaction chamber through the overflow port, and the reaction temperature is maintained at the first temperature;

3) in an aging stage:

after the feeding of the reaction top material is completed, the material in the second reaction chamber is delivered to the first reaction chamber to mix with the material in the first reaction chamber and age.

In some embodiments, the reaction system is the reaction system described above, in the first reaction stage, the material in the second reaction chamber flows out from the discharge port of the second reaction chamber and circulates through the second circulation unit to the feed port of the second reaction chamber; in the first reaction stage, the flow direction switching unit is activated so that the material that overflows from the second reaction chamber into the first reaction chamber through the overflow port flows into the first circulation unit through the discharge port of the first reaction chamber and flows into the feed port of the second reaction chamber under the action of the flow direction switching unit;

in the second reaction stage, the flow direction switching action of the flow direction switching unit is stopped so that the material in the first reaction chamber flows out from the discharge port of the first reaction chamber and circulates through the first circulation unit to the feed port of the first reaction chamber;

after the feeding of the reaction top material in the second reaction stage is completed, and in the aging stage, the flow direction switching unit is activated so that the material that flows out from the discharge port of the second reaction chamber into the second circulation unit flows into the feed port of the first reaction chamber under the action of the flow direction switching unit, so as to mix with the material in the first reaction chamber and age.

After the reaction in the aging stage is completed, the reaction solution is subjected to a subsequent degassing process, and the unreacted monomer and chain transfer agent are removed by means well known to those in the art, for example, at an absolute pressure of 0.1 pa-10 kpa and 120° C.-170° C.

In some embodiments, the first temperature is 100° C.-140° C. (for example, 100° C., 110° C., 120° C., 130° C. and 140° C.); the aging stage is performed at temperature the same as or different from the first temperature, preferably at a temperature 10° C.-30° C. (for example, 10° C., 20° C. and 30° C.) higher than the first temperature. The aging is preferably performed for 0.5-4 hours (for example, 0.5 hour, 1 hour, 2 hours, 3 hours and 4 hours).

In some embodiments, the reaction base material includes part of polyether polyol, a stabilizer and a chain transfer agent, and the reaction top material includes remaining polyether polyol, a reaction monomer and an initiator. The sum of the polyether polyol in the reaction base material and the polyether polyol in the reaction top material is the total amount of the polyether polyol, and the polyether polyol is used as the base polyether polyol.

In some embodiments, the mass of the reaction monomer is 20%-55%, for example, 20%, 30%, 40%, 50%, 55% and the like, of the sum of the total mass of the polyether polyol, the mass of the reaction monomer and the mass of the stabilizer; the percentage of the mass of the reaction monomer to the total mass of the polyether polyol is 0.1%-250%, for example, 0.1%, 1%, 10%, 30%, 50%, 100%, 140%, 180%, 220%, 250% and the like, preferably 30%-140%; the mass of the stabilizer is 0.3%-10%, for example, 0.3%, 1%, 2%, 2.5%, 5%, 7%, 10% and the like, preferably 2%-5%, of the sum of the total mass of the polyether polyol and the mass of the reaction monomer.

The initiator used in the present disclosure includes, but is not limited to, all initiators suitable for the preparation of polymer polyol. In some embodiments, the amount of the initiator is 0.01%-5%, for example, 0.01%, 0.05%, 0.1%, 1%, 2%, 5% and the like, of the sum of the total mass of the polyether polyol and the mass of the reaction monomer. The preferred initiator is known in the art, including peroxides and/or azo compounds. The peroxides are, for example, dibenzoyl peroxide, lauroyl peroxide, tert-butyl hydroperoxide, benzoyl peroxide and/or di-tert-butyl peroxide. The azo compounds are, for example, azobisisobutyronitrile (AIBN), azomethylbutyronitrile (AMBN) and/or dimethyl azobisisobutyrate (V601).

The chain transfer agent used in the present disclosure includes, but is not limited to, all chain transfer agents suitable for the preparation of polymer polyol. In some embodiments, the amount of the chain transfer agent is 0.1%-6%, for example, 0.1%, 0.2%, 0.5%, 1%, 2%, 4%, 5%, 6% and the like, preferably 0.2%-5%, of the sum of the total mass of the polyether polyol and the mass of the reaction monomer; the preferred chain transfer agent is one or more of 1-butanol, 2-butanol, isopropanol, ethanol, methanol, water, cyclohexane, thioglycolate and thiols, for example, one or more of dodecanethiol and isopropanol.

The polyether polyol, as the base polyether polyol, may be any polyether polyol suitable for the polyurethane system, for example, commercially available polyether polyols, specifically including WANOL® F3156, WANOL® F3135, WANOL® F3056 and WANOL® F3128 (WANHUA CHEMICAL). The polyether polyols in the reaction base material and in the reaction top material are the same polyether polyol, and preferably, the mass ratio of the polyether polyol in the reaction top material to the polyether polyol in the reaction base material is 1.0-7.0, for example, 1.0, 2.1, 3.0, 4.0, 5.0, 5.6, 6.0, 7.0 and the like, preferably 2.1-5.6.

The stabilizer used in the present disclosure includes, but is not limited to, all stabilizers suitable for the preparation of polymer polyol, for example, polyether polyols containing polymerizable double bonds, as described in patent applications CN105949408A, CN107090064A and CN106519148A.

The reaction monomer used in the present disclosure includes, but is not limited to, all vinyl monomers suitable for the preparation of polymer polyol. In some embodiments, the reaction monomer may be selected from one or more of an aliphatic conjugated diene compound, a vinyl aromatic compound, $\alpha,\beta$-ethylenically unsaturated nitrile, $\alpha,\beta$-ethylenically unsaturated nitrile amide, $\alpha,\beta$-ethylenically unsaturated carboxylic acid, $\alpha,\beta$-ethylenically unsaturated carboxylic ester, vinyl ester, vinyl ether, vinyl ketone, a vinyl halide and a vinylidene halide, preferably one or more of a vinyl aromatic compound and $\alpha,\beta$-ethylenically unsaturated nitrile, more preferably a composition of styrene and acrylonitrile, particularly preferably a composition of styrene and acrylonitrile in a mass radio of 10:90-90:10 (for example, 10:90, 20:80, 40:60, 50:50, 60:40, 80:20, 90:10 and the like), and further preferably a composition of styrene and acrylonitrile in a mass ratio of 60:40-90:10 (for example, 60:40, 70:30, 80:20, 90:10 and the like).

The polymer polyol of the present disclosure is well suited for the synthesis of polyurethane foams. Therefore, the present disclosure provides use of polyether polyol prepared by the method described above in the synthesis of a polyurethane foam, where the polyurethane foam is preferably a soft polyurethane foam, and specifically, the soft polyurethane foam is obtained by foaming the composition of polymer polyol and polyisocyanate.

The method for preparing the soft polyurethane foam is known in the art, as described in CN106519148A, and specifically, the soft polyurethane foam is prepared by reacting a polyurethane catalyst, a polyol, a cross-linker, a blowing agent, a foam stabilizer, an auxiliary agent with a polyisocyanate. The selection of components required for the preparation of soft polyurethane foams is not limited to the present disclosure, and the corresponding components suitable for the preparation of soft polyurethane foams in the art may be used. In some embodiments, the polyurethane catalyst is preferably an organometallic compound and/or an organic amine catalyst. The organometallic compound is, for example, stannous octoate, stannous oleate, dibutyltin dilaurate, dibutyltin acetate and/or dibutyltin diacetate. The organic amine catalyst is, for example, bis(2,2'-dimethylamino) ethyl ether, trimethylamine, triethylamine, triethylenediamine and/or dimethyl ethanolamine. The blowing agent is preferably water, acetone, carbon dioxide, haloalkanes, aliphatic alkanes and/or cycloaliphatic alkanes. The foam stabilizer is preferably an organopolysiloxane surfactant. In addition, a flame retardant, a filler, a light stabilizer, an anti-oxidant and the like may also be used in the method for preparing the soft polyurethane foam.

The present disclosure also relates to a molded article including the soft polyurethane foam described above.

The technical solutions provided by the present disclosure have the beneficial effects below.

1. The reaction system for preparing polymer polyol provided by the present disclosure has a simple reactor structure and can be maintained conveniently. Based on the reaction system, a polymer polyol having low viscosity can be obtained by a batch process, that is, the same low viscosity of the polymer polyol as continuous processes can be achieved by the batch process.

2. According to the reaction system provided by the present disclosure, with a cooler arranged in the first circulation unit and a heater arranged in the second circulation unit, the temperature of the reactor can be jointly controlled by the cooler and the heater control so that the temperature control effect of the reactor is good, the temperature fluctuation is small, and the polymerization reaction is stable. In this manner, the side reaction fouling is small, and the reactor cleaning frequency is low.

3. The polyurethane foam prepared by the polymer polyol prepared by the preparation process of the present disclosure has the characteristics of high hardness and excellent mechanical performance and has higher hardness compared with the conventional product prepared by batch processes and better tear strength and tensile strength compared with the product prepared by continuous processes.

4. The reaction chamber of the reaction system provided by the present disclosure is divided into two reaction chambers with different sizes, the products with different particle sizes can be produced in the different reaction chambers, and the particle size and proportion of the product can be adjusted by adjusting the volumes of the reaction chambers. For example, a fraction of products with smaller particle sizes are produced in the smaller reaction chamber at the beginning of the reaction, and with the reaction continuing, a large fraction of products with larger particle sizes are produced in the larger reaction chamber; and the products prepared in the two reaction chambers are then mixed and aged in the same reactor. With the reaction system of the present disclosure, the particle size distribution of the product can be adjusted, endowing the product with high solid content, low viscosity and excellent foaming performance.

DETAILED DESCRIPTION

For a better understanding of the technical solutions of the present disclosure, the content of the present disclosure is further described below in conjunction with examples. However, the content of the present disclosure is not limited to the examples set forth below.

Figure 1:
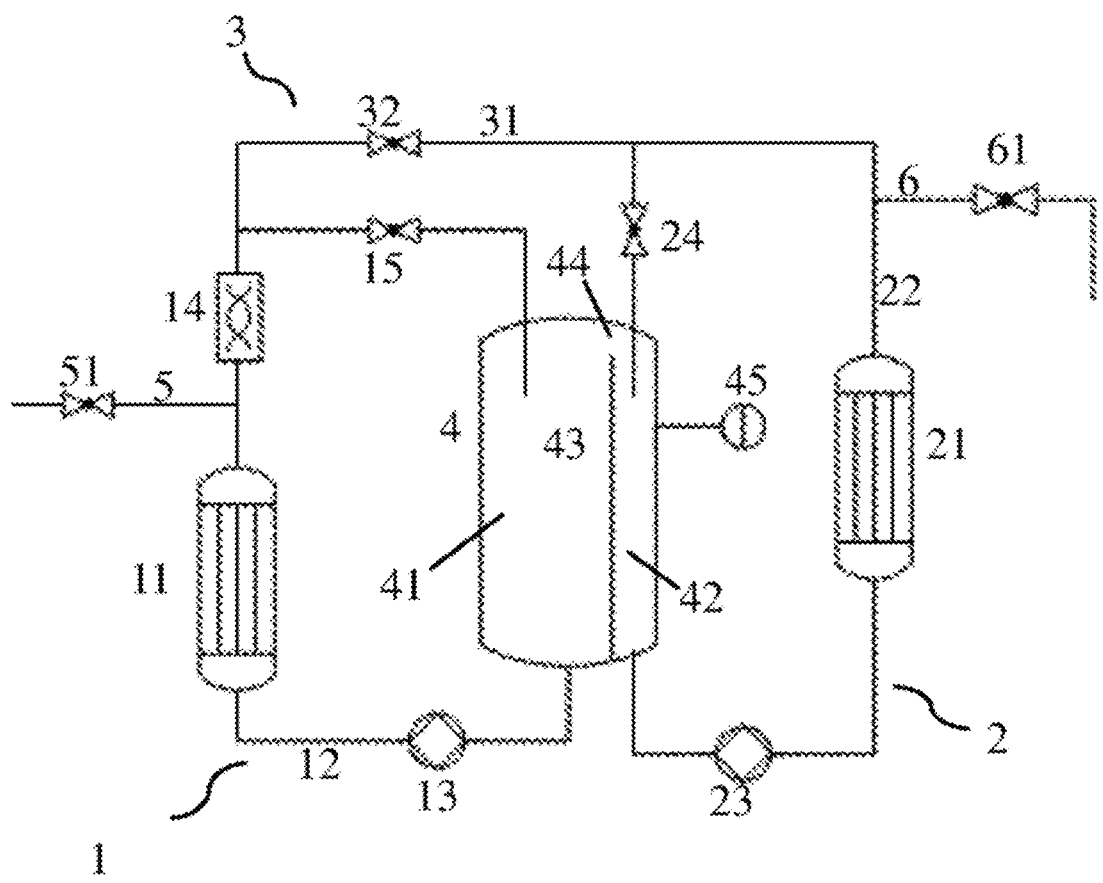
FIG. 1 is a schematic diagram of a reaction system in one embodiment.

The present disclosure provides a reaction system for preparing polymer polyol. With reference to FIG. 1, the reaction system includes a reactor 4, a first circulation unit 1, a second circulation unit 2 and a flow direction switching unit 3. The reaction cavity of the reactor 4 is divided by a partition plate 43 into two reaction chambers of different sizes, that is, a first reaction chamber 41 and a second reaction chamber 42, where the volume of the first reaction chamber 41 is greater than the volume of the second reaction chamber 42. The reactor 4 may be specifically a vertical reaction tank. The top of the partition plate 43 is provided with an overflow port 44 to communicate the first reaction chamber 41 and the second reaction chamber 42 with each other through the overflow port 44, that is, the first reaction chamber 41 and the second reaction chamber 42 can overflow the material to each other's accommodation space through the overflow port 44. Specifically, with reference to FIG. 1, the partition plate 43 is, for example, configured such that there is a space between the top of the partition plate 43 and the top of the reactor 4, so as to form the overflow port 44. Of course, other manners of forming the overflow port 44 are not excluded. The reactor 4 is provided with a temperature measurement element 45 for measuring the temperature in the reactor 4. The temperature measurement element 45 is well known in the art and may be any meter as long as the meter can measure the temperature, such as a thermocouple, a thermistor, a thermosensitive resistor and the like.

The first circulation unit 1 is arranged between the discharge port (not shown in the figure) and the feed port (not shown in the figure) of the first reaction chamber 41. Specifically, for example, the discharge port of the first reaction chamber 41 is located at the bottom of the first reaction chamber, and the feed port is located at the top of the first reaction chamber 41. Under the action of the first circulation unit 1, the material in the first reaction chamber 41 may circulate between the discharge port of the first reaction chamber 41 and the feed port of the first reaction chamber 41, that is, the material flowing out from the discharge port of the first reaction chamber 41 may circulate back to the feed port of the first reaction chamber 41 under the action of the first circulation unit 1. In addition, the first circulation unit 1 is provided with a cooler 11 for cooling materials. Specifically, the first circulation unit 1 includes a first circulation line 12, a first circulating pump 13, the cooler 11 and a first valve 15, and preferably further includes a material mixer 14. The first circulation line 12 is connected between the discharge port and the feed port of the first reaction chamber 41. In an upstream-to-downstream direction of the first circulation line 12, the first circulating pump 13, the cooler 11 and the first valve 15 are sequentially arranged on the first circulation line 12, that is, the first circulating pump 13 is closer to the discharge port of the first reaction chamber 41. Preferably, the material mixer 14 is arranged on the section between the cooler 11 and the first valve 15, and the material mixer 14 may specifically be a static mixer.

The second circulation unit 2 is arranged between the discharge port (not shown in the figure) and the feed port (not shown in the figure) of the second reaction chamber 42. Specifically, the discharge port of the second reaction chamber 42 is located at the bottom of the second reaction chamber, and the feed port is located at the top of the second reaction chamber 42. Under the action of the second circulation unit 2, the material in the second reaction chamber 42 may circulate between the discharge port of the second reaction chamber 42 and the feed port of the second reaction chamber 42, that is, the material flowing out from the discharge port of the second reaction chamber 42 may circulate back to the feed port of the second reaction chamber 42 under the action of the second circulation unit 2. In addition, the second circulation unit 2 is further provided with a heater 21 for heating materials. The cooler 11 of the first circulation unit 1 and the heater 21 of the second circulation unit 2 cooperate to control the temperature of the material, so as to control the temperature in the reactor 4. Specifically, the second circulation unit 2 includes a second circulation line 22, a second circulating pump 23, the heater 21 and a second valve 24. The second circulation line 22 is connected between the discharge port and the feed port of the second reaction chamber 42. In an upstream-to-downstream direction of the second circulation line 22, the second circulating pump 23, the heater 21 and the second valve 24 are sequentially arranged on the second circulation line 22, that is, the second circulating pump 23 is closer to the discharge port of the second reaction chamber 42.

The flow direction switching unit 3 is arranged between the first circulation unit 1 and the second circulation unit 2, and under the action of the flow direction switching unit 3, the first circulation unit 1 and the second circulation unit 2 communicate to each other, so as to adjust the flow direction of the material. Specifically, under the action of the flow direction switching unit 3, the material in the first circulation unit 1 may be switched either to flow to the feed port of the first reaction chamber 41 or to flow to the feed port of the second reaction chamber 42, or the material in the second circulation unit 2 may be switched either to flow to the feed port of the second reaction chamber 42 or to flow to the feed port of the first reaction chamber 41. Specifically, for example, the material in the first circulation unit 1 is switched from flowing to the feed port of the first reaction chamber 41 to flowing to the feed port of the second reaction chamber 42, or the material in the second circulation unit 2 is switched from flowing to the feed port of the second reaction chamber 42 to flowing to the feed port of the first reaction chamber 41. Specifically, the flow direction switching unit 3 includes a switching line 31 and a third valve 32, where the switching line 31 is connected between the first circulation line 12 and the second circulation line 22, and the third valve 32 is arranged on the switching line 31. The flow direction switching action of the flow direction switching unit 3 is started or stopped by opening or closing the third valve 32. More specifically, the switching line 31 is connected to the first circulation line 12 at a position upstream of the first valve 15, and specifically, for example, the switching line 31 is connected to the first circulation line 12 on the section of the first circulation line 12 between the material mixer 14 and the first valve 15; the switching line 31 is connected to the second circulation line 22 at a position upstream of the second valve 24, and specifically, for example, the switching line 31 is connected to the second circulation line 22 on the section of the second circulation line 22 between the second valve 24 and the heater 21.

Furthermore, the reaction system further includes a first feed line 5 and a second feed line 6, where the first feed line 5 is configured to deliver a material to the first reaction chamber 41 or the second reaction chamber 42, and the second feed line 6 is configured to deliver a material to the second reaction chamber 42. Specifically, the first feed line 5 is connected to the first circulation line 12, and in the upstream-to-downstream direction of the first circulation line 12, the position where the first feed line 5 and the first circulation line 12 are connected is upstream of the position where the switching line 31 and the first circulation line 12 are connected, and for example, the first feed line 51 is connected to the section of the first circulation line 12 between the material mixer 14 and the cooler 11. The first feed line 5 is provided with a fourth valve 51. Specifically, the second feed line 6 is connected to the second circulation line 22, for example, the second feed line 6 is connected to the section of the second circulation line 22 between the second valve 24 and the heater 21, and the second feed line 61 is provided with a fifth valve 61.

Figure 2:
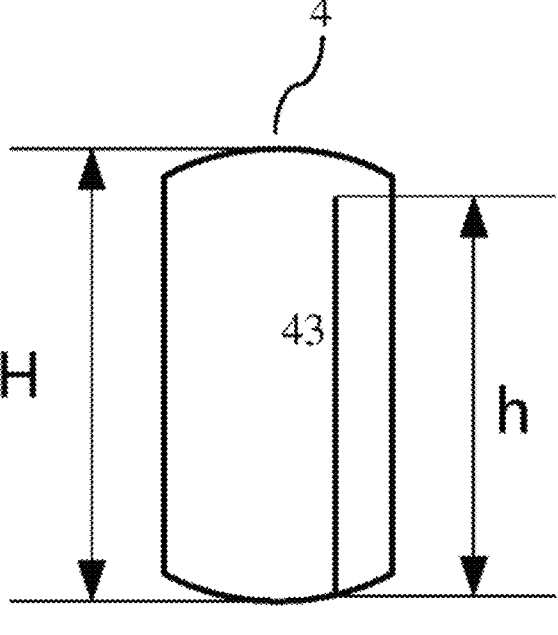
FIG. 2 is a schematic diagram of the height of the reactor and the height of the partition plate in FIG. 1.

In some embodiments, with reference to FIG. 2, the ratio of the height h of the partition plate 43 in the reactor 4 to the height H of the reactor 4 is 0.6-0.96:1, for example, 0.6:1, 0.7:1, 0.8:1, 0.9:1, 0.96:1 and the like, preferably 0.7-0.9:1, for example, 0.7:1, 0.8:1, 0.9:1.

Figure 3:
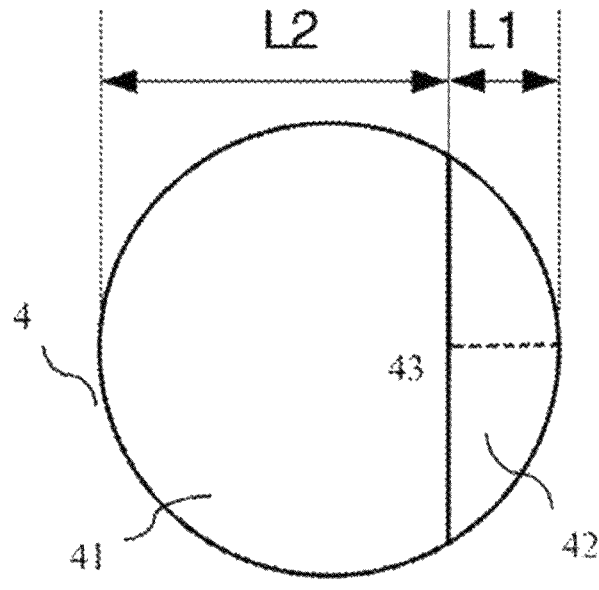
FIG. 3 is a cross-section diagram of the reactor of FIG. 1.

In some embodiments, with reference to FIG. 3, the inner diameter of the reactor perpendicular to the middle part of the partition plate is divided by the partition plate into an inner diameter section L1 located in the second reaction chamber and an inner diameter section L2 located in the first reaction chamber, and the ratio of L1 to L2 is 1:3.8-5.4, for example, 1:3.8, 1:4.3, 1:5, 1:5.4 and the like.

In some embodiments, the ratio of the volume of the first reaction chamber 41 to the volume of the second reaction chamber 42 is 4.0-19.0, for example, 4.0, 5.0, 5.6, 6, 7, 8, 8.9, 10, 15, 19 and the like, preferably 5.6-8.9.

In the reaction system, the coolant of the cooler 11 may be one or a mixture of more of water, brine and ethylene glycol, preferably deionized water. The heat source of the heater 21 may be heat transfer oil, fused salt, high-pressure steam and the like.

The "upstream" and "downstream" herein are defined in terms of the direction where the material in the line flows. For example, for the first circulation line 12, the end of the discharge port close to the first reaction chamber 41 is upstream relative to the end of the feed port close to the first reaction chamber 41. Similarly, for the second circulation line 22, the end of the discharge port close to the second reaction chamber 42 is upstream relative to the end of the feed port close to the second reaction chamber 42.

The reaction system provided by the present disclosure is particularly suitable for the preparation of polymer polyols, and through the reaction system, polymer polyols with low viscosity can be obtained by a batch possess. The reaction system has a simple structure and can be maintained conveniently.

The method for preparing polymer polyol using the reaction system provided by the present disclosure will be described in conjunction with examples.

The sources of raw materials used in the following Examples and Comparative Examples are as follows:

Polyether polyol WANOL® F3156: glycerol-initiated propylene oxide/ethylene oxide polymer with a number average molecular weight of 3000, a functionality of 3 and a hydroxyl value of 56±1 mgKOH/g, purchased from PU Business Unit of WANHUA CHEMICAL.

Stabilizer (ref. CN201310076219.5): polyether polyol having unsaturated double bonds, which is obtained by reacting glycerol-initiated propylene oxide/ethylene oxide polymer with maleic anhydride and subjecting to termination by ethylene oxide (EO), with an unsaturation of 0.065 meq/g and a hydroxyl value of 26.0 mgKOH/g, self-produced.

Acrylonitrile: purchased from SINOPEC QILU PETRO-CHEMICAL COMPANY.

Styrene: purchased from SINOPEC QILU PETRO-CHEMICAL COMPANY.

Initiator: dimethyl azodiisobutyrate, purchased from ZIBO HAIMING CHEMICAL.

Isopropanol: purchased from WANHUA CHEMICAL (YANTAI) PETROCHEMICAL CO., LTD.

Modified MDI: WANNATE®8001, purchased from PU Business Unit of WANHUA CHEMICAL.

Organic bismuth catalyst: BiCAT 8106, purchased from SHEPHERD CHEMICAL COMPANY.

Foam stabilizer: B-8715 LF2, purchased from TMG CHEMICALS CO., LTD.

The performance test method of polyurethane foam is as follows:

GB/T 10802-2006 General flexible polyether polyurethane cellular plastics

Viscosity Measurement: BROOK TECHNOLOGY CO., LTD., DV-I+prime viscometer, 4# Rotor.

Electron microscope test: SU8010 ultra-high resolution field emission scanning electron microscope from HITACHI HIGH-TECH.

Example 1

The reaction system is shown in FIG. 1. The description of the reaction system is as described above, and details will not be described herein.

The information of the reactor is listed in Table 1.

TABLE 1

| | Term | Specification |
|---|---|---|
| Reactor (Straight cylindrical shape) | Material | o6cr19ni10 |
| | Inner diameter/mm | 3000 |
| | Height/mm | 4400 |
| partition plate 43 | Material | o6cr19ni10 |
| | Height/mm | 3520 |
| | Inner diameter section L1 of the inner diameter of the reactor perpendicular to the middle part of the partition plate/mm | 566 |
| | L1:L2 | 1:4.3 |
| | Volume ratio (first reaction chamber: second reaction chamber) | 6.67:1 |
| First reaction chamber circulating pump (that is, first circulating pump 13) | Form | Centrifugal pump |
| | Maximum flow rate | 300 m³/h |

TABLE 1-continued

| | Term | Specification |
|---|---|---|
| Second reaction chamber circulating pump (that is, second circulating pump 23) | Form | Gear pump |
| | Maximum flow rate | 80 m³/h |
| Heat exchanger | Cooling medium of the cooler 11 | Deionized water |
| | Heating medium of the heater 21 | 5 kg/cm² steam (5S steam) |

The ratios of reaction raw materials are listed in Table 2.

TABLE 2

| | Material | kg |
|---|---|---|
| Reaction top material | Styrene | 7274 |
| | Acrylonitrile | 3917 |
| | Azobisisobutyronitrile | 110 |
| | Polyether polyol WANOL F3156 | 9089 |
| Reaction base material | Stabilizer | 745 |
| | Isopropanol | 945 |
| | Polyether polyol WANOL F3156 | 2785 |

The preparation process of the polymer polyol is described below in conjunction with FIG. 1.

In a first reaction stage:

After the reactor 4 was purged with nitrogen gas, nitrogen gas was charged to 50 kpa, and the mixed reaction base material was completely fed into the reactor 4 from the feed port of the second reaction chamber 42 along the second feed line 6 through the fifth valve 61. The fifth valve 61 and the first valve 15 were turned off successively, the second valve 24 and the third valve 32 were turned on, the second circulating pump 23 was started with the current of the motor maintained at 63.5% of the maximum current, and the first circulating pump 13 was started with the current of the motor maintained at 67% of the maximum current. The heater 21 was introduced with 5S steam and started heating, and the temperature measured by the temperature measurement element 45 was observed. In this process, the material in the second reaction chamber 42 was discharged into the second circulation line 22 from the discharge port of the second reaction chamber 42 under the action of the second circulating pump 23 and circulated to the feed port of the second reaction chamber 42 along the second circulation line 22, that is, the material circulated. Meanwhile, the material in the second reaction chamber 42 overflowed into the first reaction chamber 41 through the overflow port 44, and the material that overflowed into the first reaction chamber 41 was discharged into the first circulation line 12 from the discharge port of the first reaction chamber 41 under the action of the first circulating pump 13 and flowed into the feed port of the second reaction chamber 42 instead of the feed port of the first reaction chamber 41 under the action of the flow direction switching unit 3 (the third valve 32 was in the on state while the first valve 15 is in the off state).

After the temperature rose to 120° C., the fourth valve 51 was turned on, and the reaction top material mixture that was pre-mixed and cooled to 10° C. was fed along the first feed line 5, with the flow rate set to 3330 kg/h. The reaction top material flowed into the second reaction chamber 42 through the material mixer 14 on the first circulation line 12, the switching line 31 in the flow direction switching unit 3, the second valve 24 on the second circulation line 22 and the feed port of the second reaction chamber 42, sequentially. The amount of the heating medium 5S steam of the heater 21 was adjusted so that the temperature measured by the temperature measurement element 45 was maintained at 120° C.±0.5° C.

In a second reaction stage:

After the reaction top material was fed for 25 minutes, it was observed that the temperature measured by the temperature measurement element 45 rose to 121° C. The reaction started heat release. The flow rate of the reaction top material mixture in the fourth valve 51 was increased to 6600 kg/h. The first valve 15 was turned on while the third valve 32 was turned off so that the reaction top material and the material that was discharged from the discharge port of the first reaction chamber 41 no longer flowed to the second circulation line 22 but only flowed to the feed port of the first reaction chamber 41 along the first circulation line 12. The flow rate of the cooling medium of the cooler 11 was adjusted, and the reaction temperature was maintained at 120° C.

Figure 5:
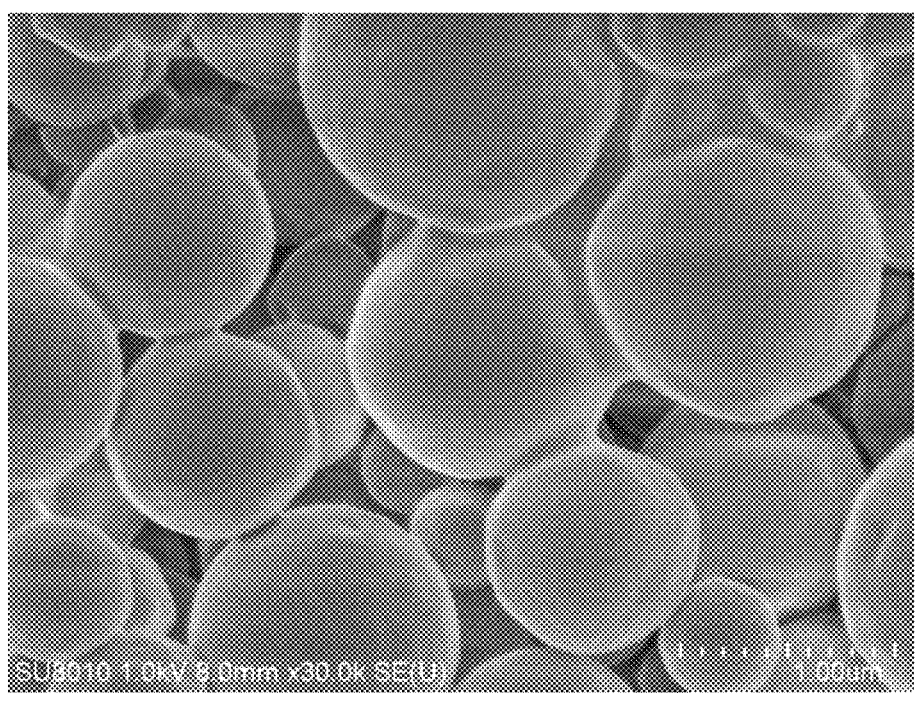
FIGS. 5 to 7 are electron micrographs of the products of Example 1, Comparative Example 1 and Comparative Example 2, respectively.

In an aging stage:

After the feeding of the reaction top material was completed, the fourth valve 51 was turned off, the third valve 32 was turned on, and the second valve 24 was turned off. After the material that was discharged from the discharge port of the second reaction chamber 42 flowed into the second circulation line 22, the material no longer circulated back to the feed port of the second reaction chamber 42, but under the action of the flow direction switching unit 3 (the third valve 32 was in the on state while the second valve 24 is in the off state), the material flowed into the first circulation line 12, flowed into the feed port of the first reaction chamber 41 through the first valve 15, then flowed into the first reaction chamber 41 and mixed with the material in the first reaction chamber 41. After the reaction temperature rose to 140° C., the mixed material was aged for 2 hours and then subjected to the subsequent degassing process. The obtained polymer polyol had viscosity of 3450 cp and solid content of 44.6 wt %, and the electron micrograph of the polymer polyol is shown in FIG. 5.

Comparative Example 1

The reactor used in the comparative example is different from the reactor used in Example 1 in that the reaction cavity of the reactor used in the comparative example is not partitioned by the partition plate 43, and the basic parameters are shown in Table 3 below.

TABLE 3

| | Term | Specification |
|---|---|---|
| Reactor 71 | Material | o6cr19ni10 |
| | Inner diameter/mm | 3000 |
| | Height/mm | 4400 |
| Circulating pump | Form | Centrifugal pump |
| | Maximum flow rate | 300 m³/h |
| Heat exchanger | Cooling medium of the cooler 72 | Deionized water |
| | Heating medium of the heater 73 | 5 kg/cm² steam (5S steam) |

Figure 4:
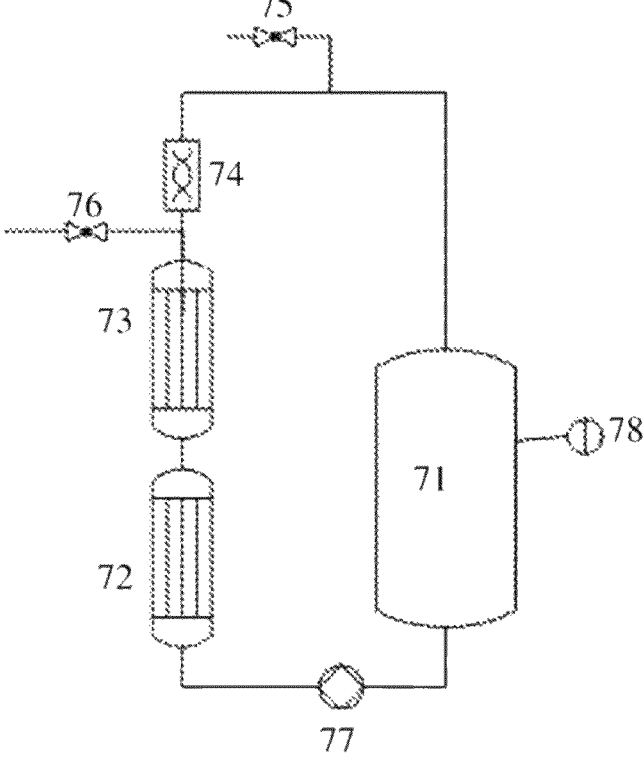
FIG. 4 is a schematic diagram of a reaction system used in Comparative Example 1.

The schematic diagram of the reaction system used in Comparative Example 1 is shown in FIG. 4.

The ratios of reaction raw materials of Comparative Example 1 are listed in Table 2.

The preparation process of the polymer polyol of Comparative Example 1 is described below in conjunction with FIG. 4.

Figure 6:
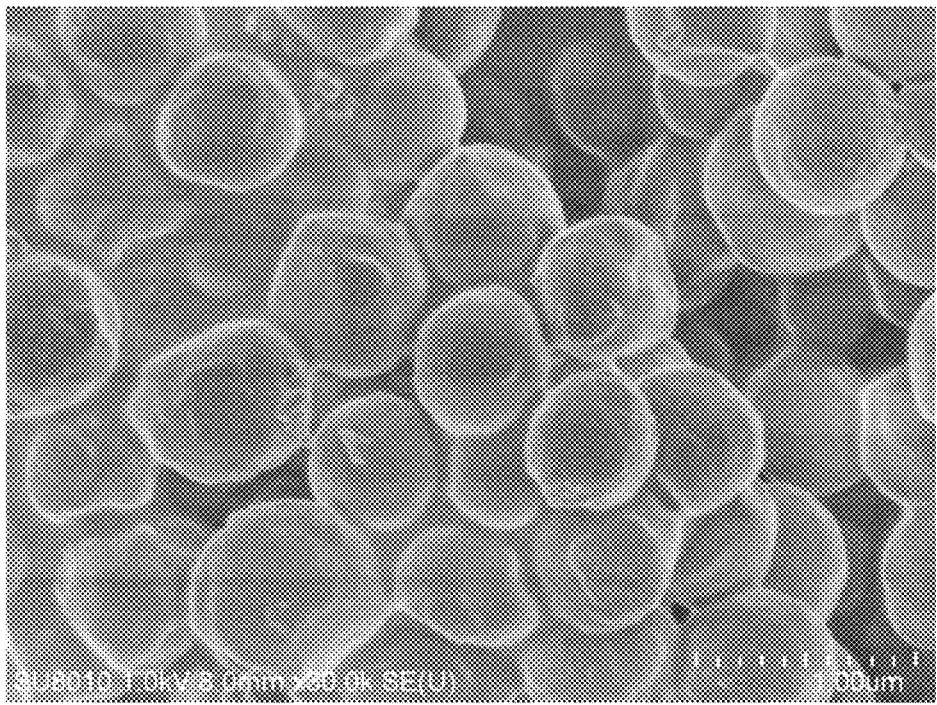

After the reactor 71 was purged with nitrogen gas, the nitrogen gas was charged to 50 kpa, and the mixed reaction base material was completely fed into the reactor 71 through the ball valve 75. The ball valve 75 was turned off, and the circulating pump 77 was started with the current of the motor maintained at 67% of the maximum current. The heater 73 was introduced with 5S steam and started heating. After it was observed that the temperature measured by the temperature detection element 78 rose to 120° C., the valve 76 was turned on, and the reaction top material mixture that was pre-mixed and cooled to 10° C. was fed, with the flow rate set to 3330 kg/h. The amount of the heating medium 5S steam of the heater 73 was adjusted so that the temperature measured by the temperature detection element was maintained at 120° C. After the feeding was carried out for 25 minutes, it was observed that the temperature measured by the temperature detection element 78 rose to 120.8° C. The reaction started heat release. The flow rate of the reaction top material mixture in the valve 76 was increased to 6600 kg/h, and the flow rate of the cooling medium of the cooler 72 was adjusted, so that the reaction temperature was maintained at 120° C. After the feeding of the reaction top material was completed, the valve 76 was turned off. After the reaction temperature rose to 140° C., the material was aged for 2 hours and then subjected to the subsequent degassing process. The obtained polymer polyol had viscosity of 5045 cp and solid content of 44.5%, and the electron micrograph of the polymer polyol is shown in FIG. 6.

Comparative Example 2

Figure 7:
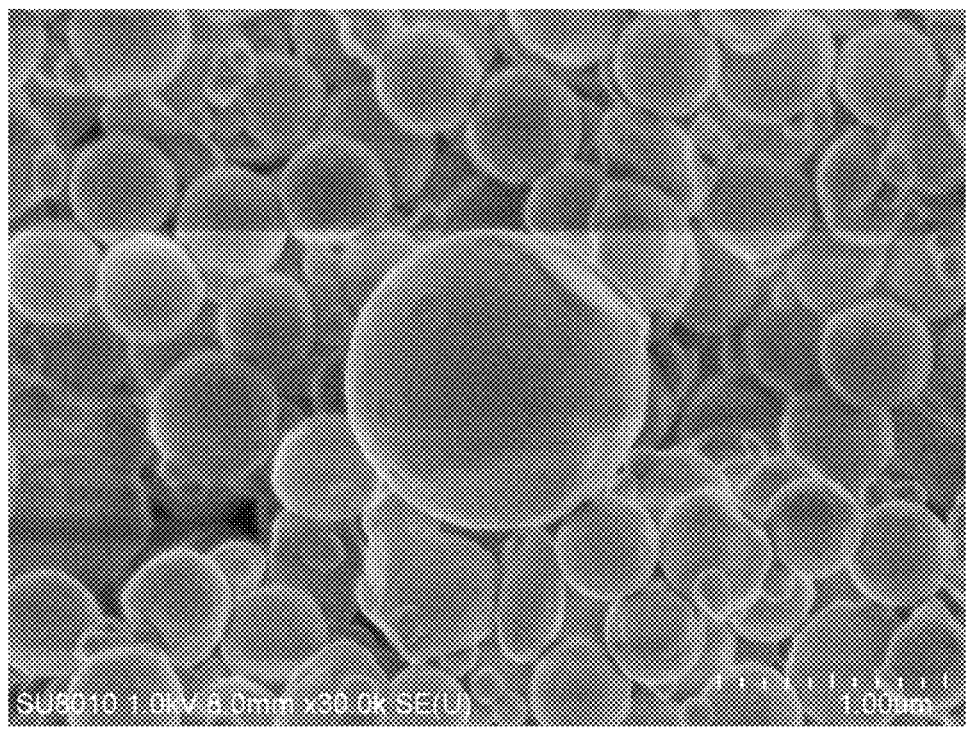

The polymer polyol was prepared by the continuous process as described with reference to the Examples 3-6 in CN201310076219.5. The raw material formula is shown in Table 2 in Example 3 in CN201310076219.5. The base polyether therein was changed to polyether polyol WANOL® F3156. The solid content was adjusted to 45%. The viscosity was measured as 3800 cp. The electron micrograph is shown in FIG. 7.

Example 2 and Comparative Examples 3-4

The method for preparing a polyurethane foam is as follows:

A composite material was prepared according to the raw materials and parts by weight shown in Table 4 (mass percentages in the table were calculated based on 100% of the total mass of the composite material), and the composite material and the isocyanate raw material WANNATE®8001 were placed at a constant temperature 22° C. for three hours, separately. 100 g of the composite material and 60 g WANNATE®8001 were mixed and stirred in a blender at a rotation number of 3000 rpm for 6 seconds. The stirred mixture was then quickly poured into an open aluminum mold (size: 300 mm long, 300 mm wide and 50 mm thick) that was pre-heated to 60° C. to foam the mixture. After 7 minutes, the foam was taken out to obtain the polyurethane foam.

TABLE 4

| Material | Example 2 | Comparative Example 3 | Comparative Example 4 |
|---|---|---|---|
| polymer polyol | Example 1 | Comparative Example 1 | Comparative Example 2 |
| | 33.59 | 33.59 | 33.59 |

15

TABLE 4-continued

| Material | Example 2 | Comparative Example 3 | Comparative Example 4 |
|---|---|---|---|
| WANOLF3156 | 59.56 | 59.56 | 59.56 |
| Diethanolamine | 0.50 | 0.50 | 0.50 |
| Water | 4.16 | 4.16 | 4.16 |
| N,N-bis(dimethylamino-propyl)isopropanolamine (CAS No.: 67151-63-7) | 0.40 | 0.40 | 0.40 |
| N,N,N'-trimethyl-N'-hydroxyethyl-bisaminoethylether | 0.50 | 0.50 | 0.50 |
| Organic bismuth catalyst | 0.10 | 0.10 | 0.10 |
| Foam stabilizer | 1.19 | 1.19 | 1.19 |

The properties of the prepared polyurethane foam were tested and listed in Table 5.

TABLE 5

| Polyurethane foam properties | | | |
|---|---|---|---|
| Foam properties | Example 2 | Comparative Example 3 | Comparative Example 4 |
| Tensile strength kpa | 110 | 109 | 100 |
| Tear strength kpa | 90 | 88 | 80 |
| Hardness/25% ILD (25% indentation) | 252 | 246 | 252 |

As shown in Table 5, the polyurethane foam of Example 2 had better tensile strength and tear strength and higher hardness. As can be seen from the electron micrograph, the product of the present disclosure was smooth and composed of particles of large particle sizes and particles of small particle sizes, and the large particle sizes and the small particle sizes are respectively uniform in size. The product prepared by the batch process was smooth, but had no particle of different particle sizes. The product prepared by the continuous process had particles of different particle sizes, but the particle size difference was large, and the appearance of the product was rough.

Those skilled in the art will appreciate that some modifications or adaptations may be made to the present disclosure based on the teachings of the description. These modifications or adaptations should fall within the scope of the present disclosure as defined by the claims.

What is claimed is:

1. A reaction system for preparing polymer polyol, wherein the reaction system comprises a reactor (4), a first circulation unit (1), a second circulation unit (2) and a flow direction switching unit (3), wherein a partition plate (43) is provided within a reaction cavity of the reactor (4), and the reaction cavity is divided into a first reaction chamber (41) and a second reaction chamber (42) by the partition plate (43), the volume of the first reaction chamber (41) is greater than the volume of the second reaction chamber (42), and the top of the partition plate (43) is provided with an overflow port (44) to communicate the first reaction chamber (41) and the second reaction chamber (42) with each other;

the first circulation unit (1) is arranged between a discharge port and a feed port of the first reaction chamber (41) and enables material in the first reaction chamber (41) to circulate between the discharge port of the first reaction chamber (41) and the feed port of the first reaction chamber (41);

the second circulation unit (2) is arranged between a discharge port and a feed port of the second reaction chamber (42) and enables material in the second reaction chamber (42) to circulate between the discharge port of the second reaction chamber (42) and the feed port of the second reaction chamber (42); and the flow direction switching unit (3) is configured to switch material in the first circulation unit (1) either to flow to the feed port of the first reaction chamber (41) or to flow to the feed port of the second reaction chamber (42), or switch material in the second circulation unit (2) either to flow to the feed port of the second reaction chamber (42) or to flow to the feed port of the first reaction chamber (41).

2. The reaction system according to claim 1, wherein the first circulation unit (1) comprises a first circulation line (12) connected between the discharge port and the feed port of the first reaction chamber (41), wherein the first circulation line (12) is sequentially provided with a first circulating pump (13), the cooler (11) and a first valve (15) in an upstream-to-downstream direction thereof;

the second circulation unit (2) comprises a second circulation line (22) connected between the discharge port and the feed port of the second reaction chamber (42), wherein the second circulation line (22) is sequentially provided with a second circulating pump (23), the heater (21) and a second valve (24) in an upstream-downstream direction thereof; and the flow direction switching unit (3) comprises a switching line (31) connected between the first circulation line (12) and the second circulation line (22), wherein the switching line (31) is provided with a third valve (32).

3. The reaction system according to claim 2, wherein the switching line (31) is connected to the first circulation line (12) at a position upstream of the first valve (15), and the switching line (31) is connected to the second circulation line (22) at a position upstream of the second valve (24).

4. The reaction system according to claim 3, wherein the reaction system further comprises a first feed line (5) and a second feed line (6), wherein the first feed line (5) is configured to deliver a material to the first reaction chamber (41) or the second reaction chamber (42); and the second feed line (6) is configured to deliver a material to the second reaction chamber (42).

5. The reaction system according to claim 4, wherein the first feed line (5) is connected to the first circulation line (12), and in the upstream-to-downstream direction of the first circulation line (12), the position where the first feed line (5) and the first circulation line (12) are connected is upstream of the position where the switching line (31) and the first circulation line (12) are connected; and/or the second feed line (6) is connected to the second circulation line (22).

6. The reaction system according to claim 1, wherein the ratio of the height of the partition plate (43) to the height of the reactor (4) is 0.6-0.96:1.

7. The reaction system according to claim 1, wherein an inner diameter of the reactor (4) perpendicular to the middle part of the partition plate (43) is divided by the partition plate into an inner diameter section L1 located in the second reaction chamber (42) and an inner diameter section L2 located in the first reaction chamber (41), and the ratio of L1 to L2 is 1:3.8-5.4; and/or the ratio of the volume of the first reaction chamber (41) to the volume of the second reaction chamber (42) is 4.0-19.0.

8. A method for preparing polymer polyol, wherein a reaction system for preparing polymer polyol comprises a reactor (4), a reaction cavity of the reactor (4) is divided by a partition plate (43) into a first reaction chamber (41) and a second reaction chamber (42), the volume of the first reaction chamber (41) is greater than the volume of the second reaction chamber (42), and the top of the partition plate (43) is provided with an overflow port (44) to communicate the first reaction chamber (41) and the second reaction chamber (42) with each other;

and the method comprises the following steps:

1) In a first reaction stage:

adding a first reaction material to the second reaction chamber (42) and heating the first reaction material; when the temperature of the first reaction material reaches a first temperature, continuously adding part of a second reaction material to the second reaction chamber (42), and maintaining the reaction temperature at the first temperature for a time period;

2) In a second reaction stage:

maintaining the reaction temperature at a temperature near the first temperature by stopping adding the second reaction material to the second reaction chamber (42) when the reaction temperature of the reaction system in the first reaction stage rises by 0.5° C. or more, continuously adding the remaining second reaction material to the first reaction chamber (41), reacting the second reaction material with the first reaction material and/or the second reaction material and/or a reaction product thereof that overflows from the second reaction chamber (42) to the first reaction chamber (41) through the overflow port (44); and 3) In an aging stage:

after the feeding of the second reaction material is completed, delivering all material remaining in the second reaction chamber (42) after the second reaction stage to the first reaction chamber (41) to mix with the material in the first reaction chamber (41) and age.

9. The method according to claim 8, in the first reaction stage, all material present in the second reaction chamber (42) during the first reaction stage flows out from the discharge port of the second reaction chamber (42) and circulates through a second circulation unit (2) to the feed port of the second reaction chamber (42); in the first reaction stage, a flow direction switching unit (3) is activated so that the first reaction material and/or the second reaction material and/or a reaction product thereof that overflows from the second reaction chamber (42) into the first reaction chamber (41) through the overflow port (44) flows into a first circulation unit (1) through the discharge port of the first reaction chamber (41) and flows into the feed port of the second reaction chamber (42) under the action of the flow direction switching unit (3);

in the second reaction stage, the flow direction switching action of the flow direction switching unit is stopped so that all material present in the first reaction chamber (41) flows out from the discharge port of the first reaction chamber (41) and circulates through the first circulation unit (1) to the feed port of the first reaction chamber (41); and after the feeding of the second reaction material in the second reaction stage is completed, and in the aging stage, the flow direction switching unit (3) is activated so that all material present in the second reaction chamber (42) after the second reaction stage that flows out from the discharge port of the second reaction chamber (42) into the second circulation unit (2) flows into the feed port of the first reaction chamber (41) under the action of the flow direction switching unit (3), so as to mix with the material in the first reaction chamber (41) and age.

10. The method according to claim 8, wherein the first temperature is 100° C.-140° C.; and the aging stage is performed at a temperature the same as the first temperature.

11. The method according to claim 8, wherein the first reaction material comprises a stabilizer, a chain transfer agent and a portion of polyether polyol, and the second reaction material comprises a reaction monomer, an initiator and a remaining portion of polyether polyol;

the amount of the initiator is 0.01%-5% of the sum of the total mass of the polyether polyol and the mass of the reaction monomer;

the amount of the chain transfer agent is 0.1%-6%, of the sum of the total mass of the polyether polyol and the mass of the reaction monomer; and the mass ratio of the polyether polyol in the second reaction material to the polyether polyol in the first reaction material is 1.0-7.0.

12. The method according to claim 8, wherein the polymer polyol is suitable for synthesis of a polyurethane foam.

13. The method according to claim 12, wherein the polyurethane foam is a soft polyurethane foam.

14. The reaction system according to claim 1, wherein the first circulation unit (1) is provided with a cooler (11) for cooling materials.

15. The reaction system according to claim 1, wherein the second circulation unit (2) is provided with a heater (21) for heating materials.

16. The reaction system according to claim 2, wherein the first circulation line (12) is also provided with a material mixer (14).

17. The method according to claim 8, wherein the aging stage is performed at a temperature 10° C.-30° C. higher than the first temperature.

18. The method according to claim 8, wherein the aging is performed for 0.5-4 hours.

19. The method according to claim 11, wherein the mass of the reaction monomer is 20%-55% of the sum of the total combined mass of the polyether polyols in the first reaction material and the second reaction material, the mass of the reaction monomer and the mass of the stabilizer; the percentage of the mass of the reaction monomer to the total mass of the polyether polyol is 0.1%-250%; and the mass of the stabilizer is 0.3%-10%, of the sum of the total mass of the polyether polyol and the mass of the reaction monomer.

* * * * *